Figure 3:
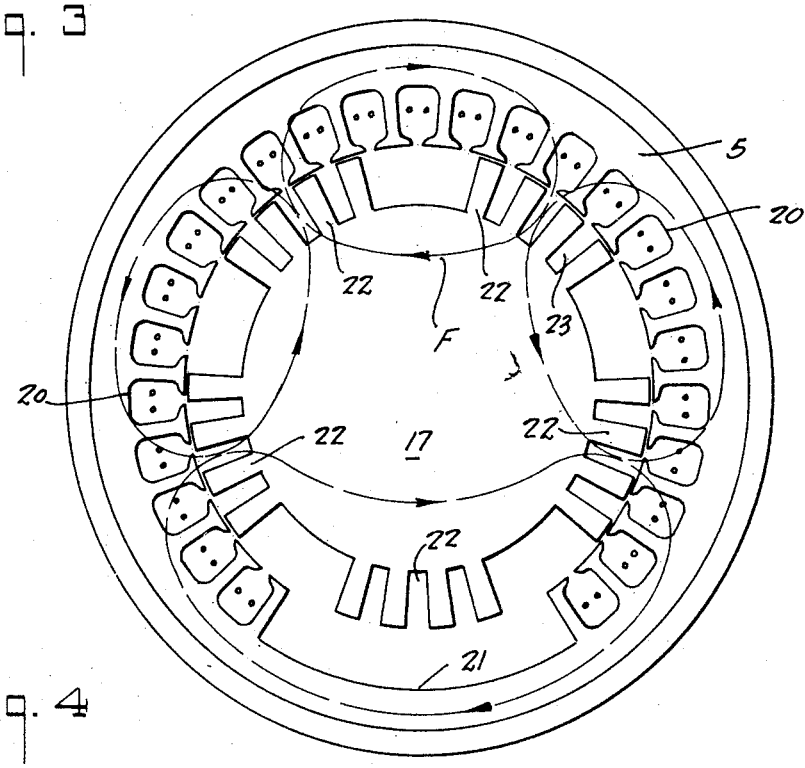

Sept. 29, 1931.  O. C. MARTIN  1,824,909
ELECTRIC MOTOR
Filed April 28, 1930  2 Sheets-Sheet 1
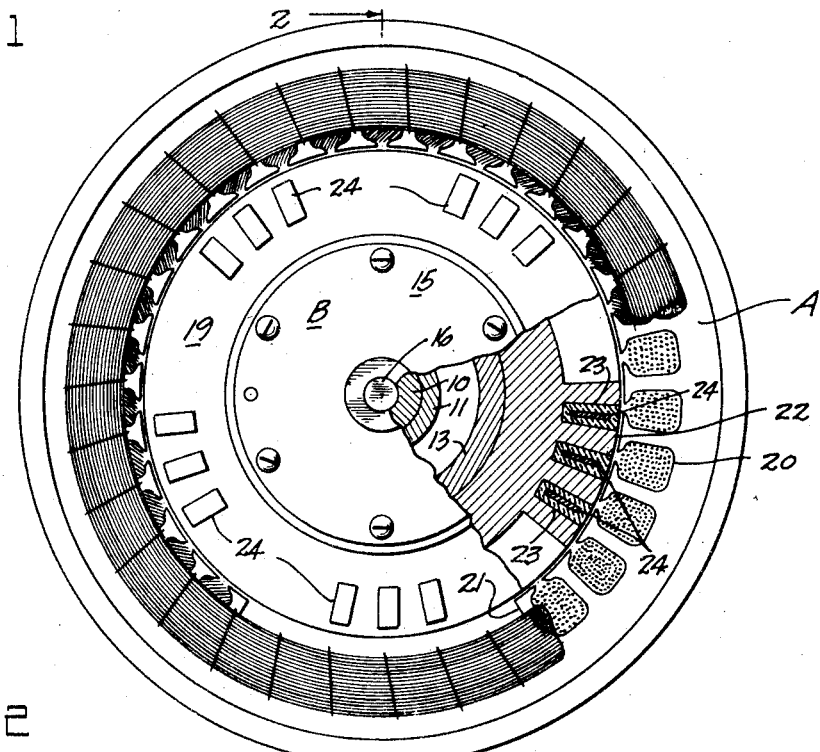
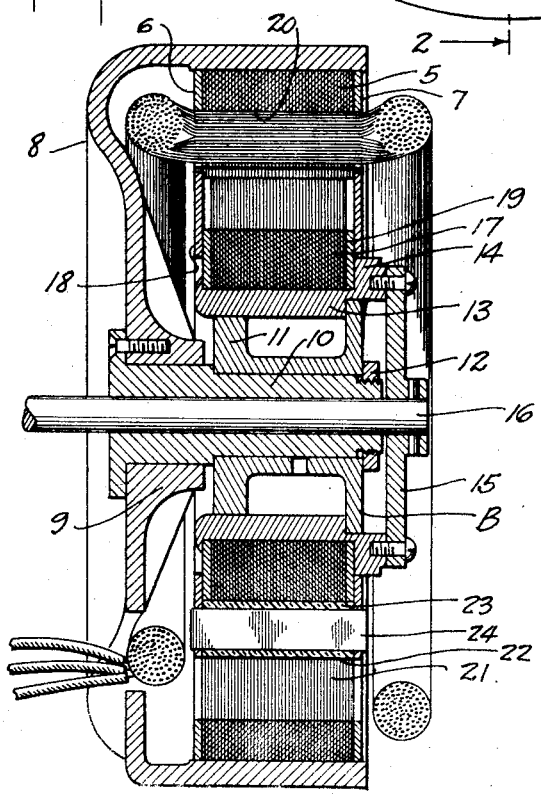
INVENTOR
Otis C. Martin
BY Westall and Wallace
ATTORNEYS Sept. 29, 1931.  O. C. MARTIN  1,824,909
ELECTRIC MOTOR
Filed April 28, 1930   2 Sheets-Sheet 2

INVENTOR
*Otis C. Martin*
BY *Westall and Wallace*
ATTORNEYS

Patented Sept. 29, 1931

1,824,909

UNITED STATES PATENT OFFICE

OTIS C. MARTIN, OF LOS ANGELES, CALIFORNIA

ELECTRIC MOTOR

Application filed April 28, 1930. Serial No. 447,909.

This invention relates to a multiphase synchronous motor having a rotor and a stator, one of which is wound to produce a rotating or oscillating magnetic field. The windings are distributed to provide an even number of field poles distributed over a portion of a circle to produce equally spaced field poles in an arc with an effective neutral polar space between the ends of the arc. The other member comprises an odd number of salient poles spaced at equal angles, one or an odd number of salient poles lying within the neutral polar space and the remainder of the salient poles being equal in number to the field poles. The ultimate object of this invention is to provide a synchronous motor which will rotate at a speed proportional to the frequency of the alternating current divided by an odd number.

Heretofore synchronous motors have been constructed with an even number of poles in both stator and rotor, the field poles being equally spaced. The result is that a speed of rotation of the rotor is attained equal to the frequency divided by an even number. In some instances, it is desirable to obtain a speed of rotation with a given frequency which is intermediate successive adjacent speeds attainable by such motors. As illustrative of a specific case, motion picture and sound recording equipment have been found to give best results with a speed of twenty four picture frames per second or ninety feet of film passing per minute. The shutter shaft for such speed should be 1440 revolutions per minute. At a frequency of 60 cycles per second which is a frequency commonly available from power supply lines, the ordinary synchronous motor is operable with four poles at 1800 revolutions per minute and with six poles at 1200 revolutions per minute. The desired speed of 1440 revolutions per minute is intermediate and could be attained with five poles. The present practice is to employ gearing to produce the desired speed. As is well known gearing is objectionable because of noise and because it is extra mechanism. My motor has been developed to produce in effect a five pole synchronous motor whereby the shutter shaft may be directly driven from a synchronous motor operating on sixty cycles. However, it will be obvious from the subjoined specification that with other frequencies and other pole numbers a variety of speeds may be attained not now available in synchronous motors.

The objects of this invention are to provide a motor structure having the before mentioned and desired features.

These objects together with other objects and corresponding accomplishments are obtained by means of the embodiment of my invention illustrated in the accompanying drawings, in which:—

Figure 4:
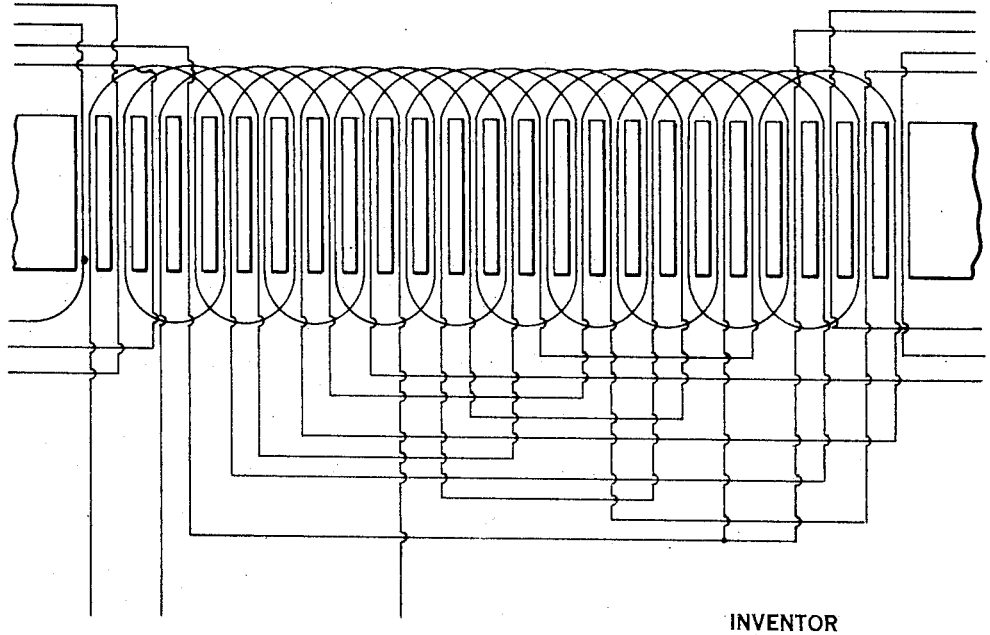

Fig. 1 is a side elevation partly in section of an assembled multiphase synchronous motor, details unessential to the inventive feature being omitted; Fig. 2 is a section as seen on the line 2—2 of Fig. 1; Fig. 3 is a view of a stator lamination and a rotor lamination in motor assembled relation, conductors in the stator slots being indicated by small circles; and Fig. 4 is a wiring diagram of the stator shown in developed form.

Referring to the particular construction shown, the stator marked A comprises laminations 5 held in assembled relation by end rings 6 and 7. A bell housing 8 is mounted over the laminations and is provided with a hub 9 in which is mounted a bearing journal 10. The bearing journal 10 is hollow and has a threaded end.

The rotor B comprises a bearing hub 11 rotatably mounted on bearing journal 10 and held in place by a nut 12 threaded on journal 10. Secured by a press fit to hub 11 is a ring 13 having an annular offset 14 to receive a plate 15. The latter is secured to the motor shaft 16 which is journalled in member 10. Built up on ring 13 are rotor laminations 17 disposed between end plates 18 and 19.

The stator is provided with slots 20, there being twenty four slots shown distributed equally along an arc of two hundred eighty eight degrees or four fifths of a circle. The remaining arc of the circle comprises seventy two degrees or one fifth of the circle. It is cut away as best shown in Fig. 3 and denoted by 21 so as to provide a relative long air gap. A three phase distributed winding is laid in slots 20 as indicated in Fig. 4. The neutral space at 21 forms a gap in the spacing of the windings so that a rotating magnetic field in effect jumps the gap. Geometrically the stator has five poles, but magnetically, one of these is neutral.

The rotor B has five salient poles, each marked 22. These poles are slotted as indicated by 23 to receive bars 24 turned over and electrically connected to end rings 18 and 19 and forming a squirrel cage induction motor rotor. These bars form no part of the present invention and are merely for the purpose of providing starting means for the motor. The salient poles of the rotor are angularly equal spaced with relation to the field poles of the stator.

The motor after having been started and having reached synchronous speed operates as a synchronous motor. The field flux indicated conventionally by the ellipses in Fig. 3 and marked F travel geometrically two hundred eighty eight degrees and continue progressive movement without lapse of time from the arcuate beginning of the windings, deleting a time interval in the three hundred and sixty degrees of the stator equal to the angular extent of one field pole. During the time required for the field to traverse the stator, the rotor turns geometrically two hundred and eighty eight degrees and the deleted field pole space is traversed in the same time interval as the active field pole spaces. The magnetic field moves effectively through three hundred sixty degrees, while the rotors travel through two hundred eighty eight degrees, for a salient pole must physically travel over the neutral or inactive polar space. Thus, the speed of the rotor is that of a five pole stator winding.

The enlarged air gap at 21 is provided to impede magnetic flux from passing at this neutral position between stator and rotor. If the flux were permitted to pass, it would set up a field which would oscillate back and forth along the neutral gap, thereby superimposing on the rotor an oscillating magnetic field. This would superimpose a physical oscillation on the rotor cause noise and develop heat due to eddy current and hysteresis losses. The enlarged air gas reduces this to an inappreciable amount.

It will be apparent that any suitable type of stator winding may be employed and the number of windings varied. It is also obvious that the induction motor bars or their equivalent in the rotor are not pertinent to the invention.

What I claim is:—

1. A synchronous motor having a rotor member and a stator member, windings on one of said members to produce a magnetic field with an even number of field poles spaced along an excitation arc at equal angles, the remaining arc of the circle being unwound and constituting a neutral arc, the other member having salient poles equally spaced about a circle at angles equal to the angles between said field poles.

2. A synchronous motor having a rotor member and a stator member, windings on one of said members to produce a magnetic field with an even number of field poles spaced along an excitation arc at equal angles, the remaining arc of the circle being equal angularly to an odd number of field poles, the other member having salient poles equally spaced about a circle at angles equal to the angles between said field poles.

3. A synchronous motor having a rotor member and a stator member, windings on one of said members to produce a magnetic field with an even number of field poles angularly spaced equally along an excitation arc, the remaining arc of the circle being equal to the angle between adjacent field poles, the other member having salient poles equally spaced in a circle and one greater in number than said field poles.

4. A synchronous motor having a rotor and a stator, windings on said stator to produce a magnetic field with an even number of field poles spaced along an excitation arc at equal angles, the remaining arc of the circle being equal angularly to an odd number of field poles, the rotor having salient poles equally spaced about a circle at angles equal to the angles between said field poles.

5. A synchronous motor having a rotor member and a stator member, windings on one of said members to produce a magnetic field with an even number of field poles angularly spaced equally along an excitation arc, the remaining arc of the circle being angularly equal to the angle between adjacent field poles, the other member having salient poles equally spaced in a circle and one greater in number than said field poles.

6. A synchronous motor having a rotor member and a stator member, windings on one of said members to produce a magnetic field with an even number of field poles spaced along an excitation arc at equal angles, the remaining arc of the circle being equal angularly to an odd number of field poles, the other member having salient poles equally spaced about a circle at angles equal to the angles between said field poles, the air gap between said members being uniform over the excitation arc and of greater magnitude over said remaining arc.

7. A synchronous motor having a rotor member and a stator member, windings on one of said members to produce a magnetic field with an even number of field poles angularly spaced equally along an excitation arc, the remaining arc of the circle being equal to the angle between adjacent field poles, the other member having salient poles equally spaced in a circle and one greater in number than said field poles, the air gap between said members being uniform over the excitation arc and of greater magnitude over said remaining arc.

8. A synchronous motor having a rotor member and a stator member, windings on one of said members to produce a magnetic field with four field poles spaced along an excitation arc at equal angles, the remaining arc of the circle constituting a neutral arc being equal angularly to one field pole, the other member having five salient poles equally spaced about a circle.

9. A synchronous motor having a rotor member and a stator member, windings on one of said members to produce a magnetic field with four field poles angularly spaced equally along an excitation arc, the remaining arc of the circle constituting a neutral arc equal angularly to one field pole, the other member having five salient poles equally spaced in a circle, the air gap between said members being uniform over the excitation arc and of greater magnitude over the remaining arc.

10. A synchronous motor having a rotor and a stator, windings on said members to produce a magnetic field with four field poles spaced along an excitation arc at equal angles, the remaining arc of the circle constituting a neutral arc and being equal angularly to one field pole, the rotor having five salient poles equally spaced about a circle, the air gap between said rotor and stator being uniform over the excitation arc and of greater magnitude over said neutral arc.

11. A synchronous motor having a rotor and a stator, windings on said stator to produce a magnetic field with four field poles angularly spaced equally along an excitation arc, the remaining arc of the circle constituting a neutral arc and being equal angularly to one field pole, the rotor having five salient poles equally spaced in a circle, the air gap between said rotor and stator being uniform over the excitation arc and of greater magnitude and uniform over said neutral arc.

In witness that I claim the foregoing I have hereunto subscribed my name this 23d day of April, 1930.

OTIS C. MARTIN.